(12) United States Patent
Trulaske

(10) Patent No.: US 7,825,949 B2
(45) Date of Patent: Nov. 2, 2010

(54) CLOSED CIRCUIT VIDEO MAGNIFICATION SYSTEM

(76) Inventor: James A. Trulaske, 8501 Delport St., St. Louis, MO (US) 63114

( * ) Notice: Subject to any disclaimer, the term of this patent is extended or adjusted under 35 U.S.C. 154(b) by 1285 days.

(21) Appl. No.: 11/359,800

(22) Filed: Feb. 22, 2006

(65) Prior Publication Data
US 2006/0203093 A1 Sep. 14, 2006

Related U.S. Application Data

(60) Provisional application No. 60/659,980, filed on Mar. 9, 2005.

(51) Int. Cl.
H04N 9/47 (2006.01)
(52) U.S. Cl. ...................................... 348/63
(58) Field of Classification Search ............... 348/62, 348/63; 382/114
See application file for complete search history.

(56) References Cited

U.S. PATENT DOCUMENTS

| 2,420,716 | A | | 5/1947 | Morton et al. |
| 3,816,646 | A | | 6/1974 | Cinque |
| 3,819,855 | A | | 6/1974 | Rush et al. |
| 3,993,865 | A | | 11/1976 | Browne et al. |
| 4,115,813 | A | | 9/1978 | Mikami |
| 4,136,361 | A | | 1/1979 | Doan |
| 4,838,791 | A | | 6/1989 | Bogasiam, Jr. et al. |
| 4,928,170 | A | | 5/1990 | Soloveychik et al. |
| 5,046,163 | A | | 9/1991 | Priest et al. |
| 5,194,956 | A | | 3/1993 | Iwamoto |
| 5,267,331 | A | * | 11/1993 | Siwoff .......................... 348/62 |
| 5,633,674 | A | | 5/1997 | Trulaske |
| D392,303 | S | * | 3/1998 | Hern .......................... D16/225 |
| 6,791,600 | B1 | * | 9/2004 | Chan ............................ 348/63 |
| D559,298 | S | * | 1/2008 | Sukenari et al. ............. D16/221 |
| 2005/0122396 | A1 | * | 6/2005 | Mizukami et al. ............. 348/63 |

* cited by examiner

Primary Examiner—Jason Whipkey
(74) Attorney, Agent, or Firm—Paul M. Denk

(57) ABSTRACT

A closed circuit video magnification system, incorporates a base, upon which the operating components of this system mount, a platform mounted upon the base for shiftable movement both laterally and depth-wise, in the X-Y directions, pivotal mount a LCD screen for projection and viewing of any matter scanned upon the shiftable platform, or of any other images that are detected and picked up by the miniature camera, also incorporated into the structure of this system. The miniature camera is also mounted upon shiftable arms, for scanning downwardly towards the platform, or which can be pivoted vertically, or circularly, in order to view any scene provided in the surrounding area, and which is capable of being picked up by the lens of the camera, for processing and projecting onto the screen, for viewing by the handicapped person. Controls are provided for regulating the amplification, reduction of size, brightness, and contrast, in addition to its on/off control.

11 Claims, 5 Drawing Sheets

CLOSED CIRCUIT VIDEO MAGNIFICATION SYSTEM

CROSS REFERENCE TO RELATED APPLICATION

This nonprovisional patent application claims priority to the provisional application having Ser. No. 60/659,980, which was filed on Mar. 9, 2005.

FIELD OF INVENTION

This invention relates generally to scanning technology, and more specifically pertains to the usage of a miniature camera or television that is capable of scanning a sheet of text, design, or other materials, and project them onto a screen with amplification attributes and benefits.

BACKGROUND OF THE INVENTION

Various types of scanning mechanisms for amplifying or magnifying the text of any writings, the designs of any drawings, or any other materials that are capable of being reviewed and read, but to the disabled person, are difficult of viewing, have involved scanning devices, like miniature cameras, of a television mode type, that can scan such text, and amplify it onto a television screen, to which it was electrically connected. The use of miniature cameras, to achieve such activity, have been available in the art, and one such camera system is shown in an earlier patent to the inventor herein, patent No. U.S. Pat. No. 5,633,674.

Others have utilized scanning technology, of the camera type, to achieve related results, and these are known in the art.

The subject matter of the current invention is to provide a system, including an apparatus that is self contained, and provides a two dimensional shiftable platform, upon which correspondence, book, or other text or design materials, can rest, and the platen upon which they rest is shiftable in lateral and depth dimensions, so as to allow a camera to focus thereabove to scan the page, and project it onto an integral screen, to allow the impaired party to easily read the materials, through the usage of this system.

SUMMARY OF THE INVENTION

This invention contemplates a fully integrated system that incorporates a structured base, upon which a platen or platform is shiftably mounted, and which can be moved laterally, and depth-wise, to provide a fully manipulatable platen upon which text or other written materials may be located, to provide for their ease of scanning, and subsequent projection for immediate review and reading on a conveniently arranged screen. The platen is structured onto the base of this particular apparatus. Interconnecting with the base are a series of manipulable arms, that extend upwardly, and provide for the mounting of a screen, forwardly of the platform, and which screen furnishes a television or LCD type of screen, onto which scanned materials may be projected, for further magnified viewing for the convenience of the user. For example, the screen may provide for full projection of the image of the materials being scanned. It may further provide for further enlargement, or reduction in the size of the print, to the convenience of the user, and to accommodate the disabled to adjust the scanning mechanism to that degree that furnishes the most convenient viewing depending upon the handicap experienced by the user, and his/her requirements for viewing the material projected thereon. In addition, the brightness of the screen may be enhanced, or reduced, depending upon the viewing needs of the user. In addition, a mode control is further furnished for ease of usage and application by the user, and it will convert the various modes of viewing of the screen, so as to further enhance the amount of contrast experienced, with respect to what is projected for viewing upon the screen, once again, for the benefit and the enhancement of the handicapped user.

A second structural means extends upwardly from the base, and it provides for a cross bracing for support of both the illumination means for the invention, in addition to providing a universal connection for mounting of the mini cam, or scanning camera, which is a form of a miniature television camera that normally is projected downwardly onto the surface of the platen, in order to scan and detect for projection on the screen, the type of materials displayed thereon. Or, since the mini cam is mounted on a universal connection, it can be pivoted into other directions, in order to pick up views of the surrounding area, to further enhance the versatility and usage of this invention for the convenience of its user. For example, if the student suffers from some degree of blindness, or may be legally blind, but yet can view and detect scanned materials if they are amplified, and presented directly in front of one's line of vision, then the camera, as in a class room setting, can be turned toward the instructor, the blackboard, and pick up views of what is currently occurring in the form of instruction from the professor, and project it immediately onto the screen, so the student has the same abilities to see the full lecture, to scan the entire blackboard where course materials may be written by the professor, in order to allow the student the same degree of instruction, as experienced by other students, who are not physically or handicap impaired.

It is, therefore, the principal object of this invention to integrate all aspects of a scanning system that can generally amplify detected materials, scanned by a miniature camera, and project it onto a screen for the benefit of its handicapped user.

Another object of this invention is to provide a fully manipulated system that can be physically maneuvered by the student, or others, and be conveniently set up directly in front of the view of the user, to provide instant vision at that degree of amplification and contrast that furnishes the handicapped person the same attributes of normal vision.

These and other objects will become more apparent to those skilled in the art upon review of the summary of the invention as provided herein, and upon undertaking a study of the description of its preferred embodiment, in view of the drawings.

DESCRIPTION OF THE PREFERRED EMBODIMENT

Figure 1:
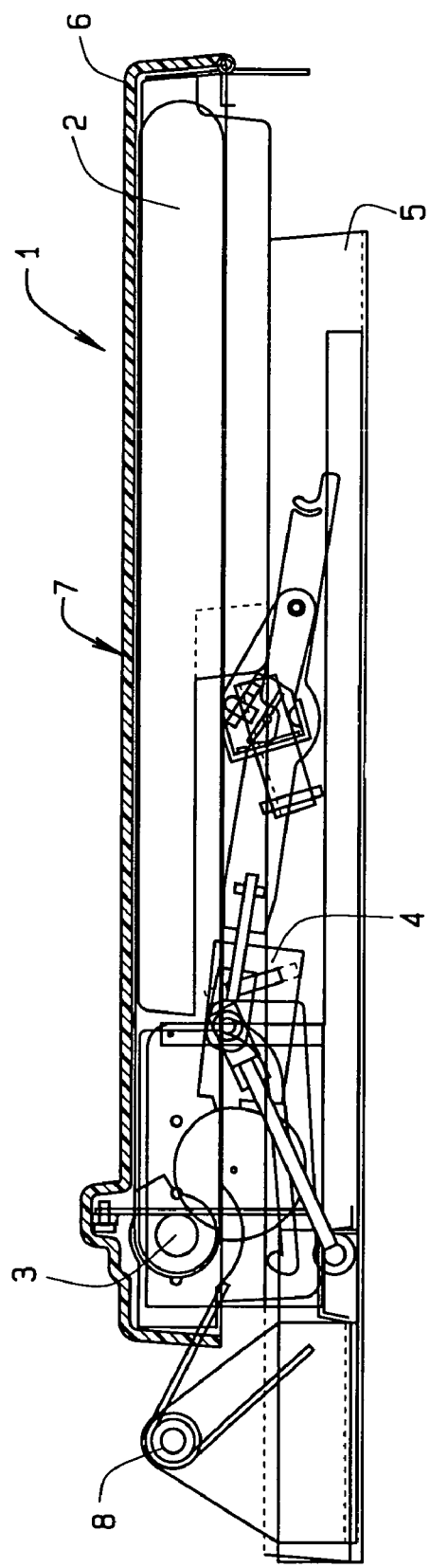
FIG. 1 provides a collapsed side view of the closed circuit video magnifier of this invention.

In referring to the drawings, and in particular FIG. 1, the collapsed side view of the system of this invention is readily disclosed in the compacted state. System 1 includes a LCD or liquid crystal display panel 2 which connects at its back end, by means of a series of pivot points 3, with extendable arms (not shown), as will be subsequently described. Also mounted within the structure for pivotal movement is the miniature camera, or TV cam 4, which likewise is mounted for universal pivot and manipulation, once again, for reasons as will be subsequently described. A platform base 5 provides for stable support and resting of the entire system upon a table, desk, or other surface. A platen or platform 6 is mounted for shifting relative to the base 5, and can be slid either laterally, or depth-wise, relative to the structure of the system, so that once any materials, to be scanned, are placed upon the surface 7 of the platen, and the mini cam can easily scan the materials, to provide for projecting of the scanned materials, either in amplification, magnification, or even of decreased size, onto the LCD screen 2, as aforesaid.

The various supporting means, as at 8, and which supports the variety of arms that allows for forward pivotal movement, or pivotal movement between an upright, rear, or forward direction, for both the mini cam, and the supported LCD screen, is provided thereat.

Figure 2:
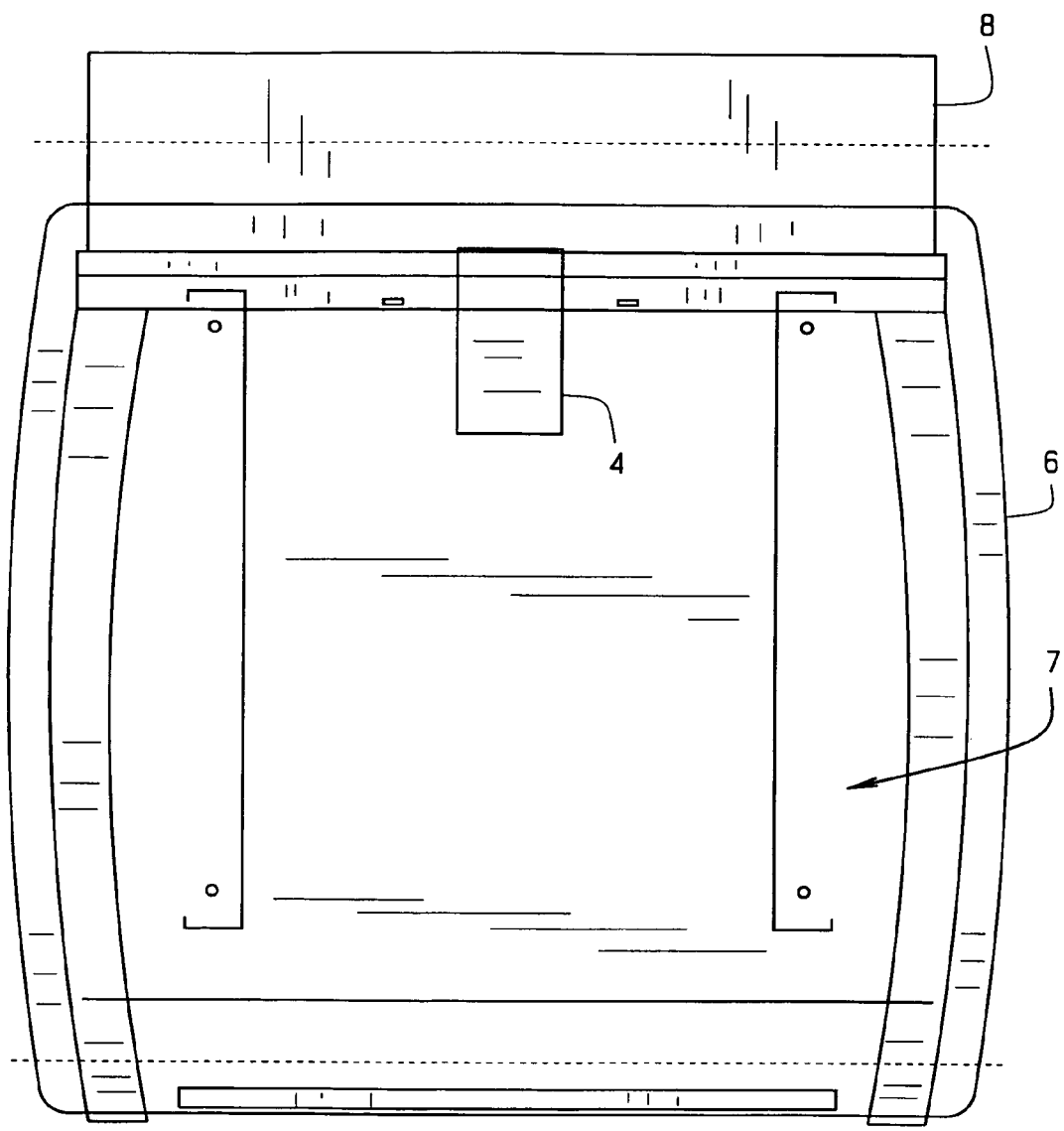
FIG. 2 provides a top plan view thereof.

FIG. 2 provides a top plan view of the scanning system of FIG. 1. Components shown therein are the same as those as previously reviewed, and which are identified by means of their shown reference characters.

Figure 3:
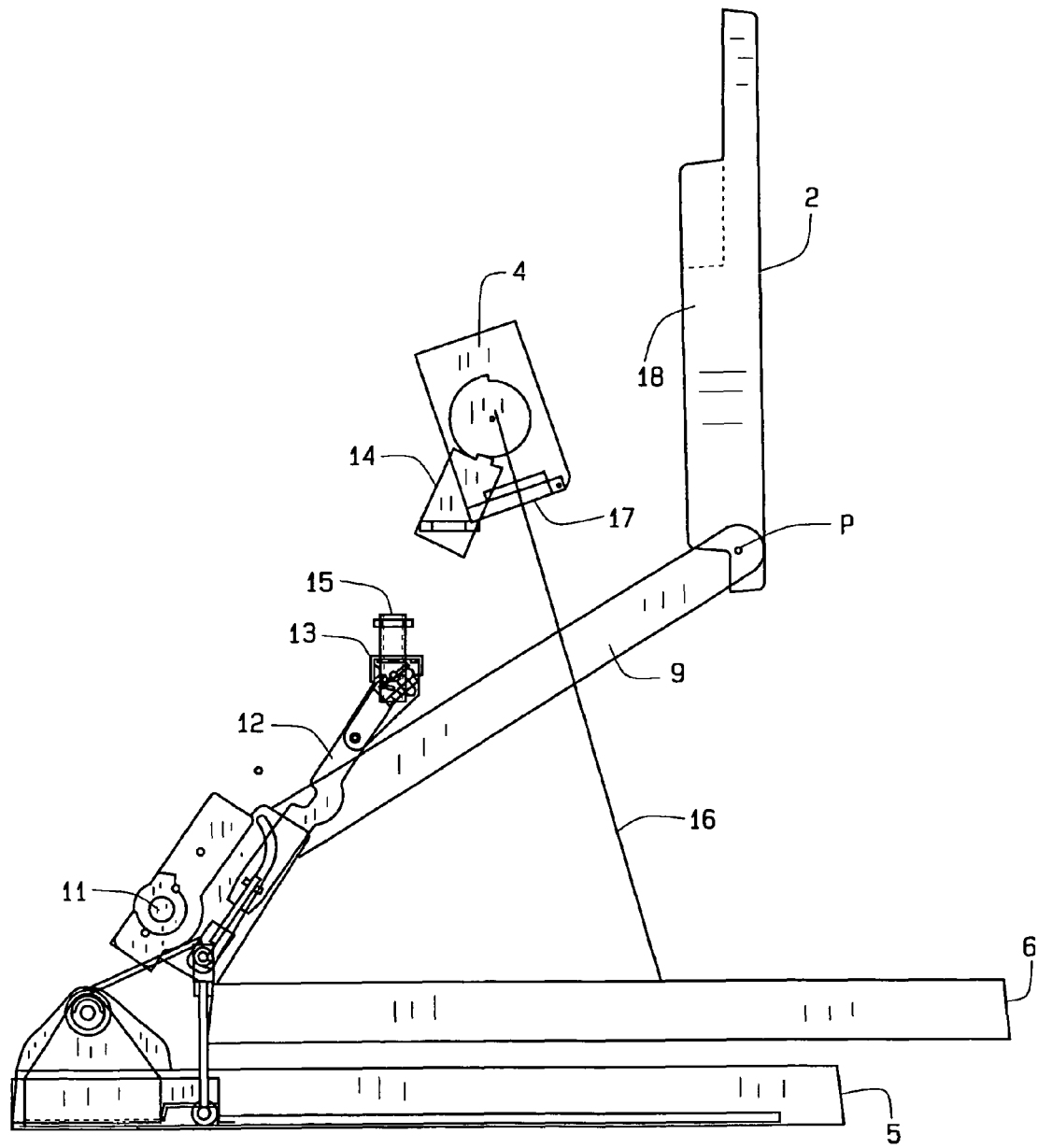
FIG. 3 is a side view, with the liquid crystal display panel extended into its viewable position, and the mini camera erected and directed downwardly, for scanning any materials upon its associated platen.

The side view, as provided in FIG. 3, discloses the relative positioning of the various components that make up the structure of this system where erected for usage. It shows in greater detail the various components as embodied within its assembled structure. For example, the base 5 is more accurately shown. The shiftable platform 6, which mounts upon the base 5, and can be shifted depth-wise, relative to the base, or laterally, relative to its own supporting structure, and is readily disclosed. The arms 9 that allow for the pivot upwardly and forwardly of the LCD screen 2 are shown. Since these arms, there being to two in number, one to either side, as shown at 9, pivotally connect the screen 2, as at 10, and likewise pivot to the supporting base structure, as at 11, these arms are capable of pivoting upwardly, forwardly, generally along a circumferential line dictated by the location of the pivot pin 11, so as to dispose the LCD screen upwardly, and forwardly, in the manner as shown at 2, in FIG. 3. In addition, further linkage 12 provides for support of a cross rail 13 which connects with a camera support 14, and which camera support 14 is pivotal or even rotatable relative to its support upon the cross rail 13, by means of a support pin 15. The mini cam, or miniature television, as previously described at 4, mounts onto the camera support 14, and can pivot upwardly or downwardly, within its support bracket 14, as can be understood. In the position as shown in FIG. 3, the viewing lens 15 of the camera is directed downwardly, and its line of vision, as indicated at 16, can readily detect any materials, whether it be textual, design, or anything else to be scanned that is rested upon the shiftable platform 6, during usage of this particular system.

As can be readily understood, circuitry is provided to allow for operations of the miniature camera, in a manner as known in the art. This is also disclosed in the said U.S. Pat. No. 5,633,674, as previously referred to herein. In addition, the circuitry provides for collecting of data, visually, and processes the data within a circuit board, as at 18, provided internally of the LCD screen 2, generally within its overall housing structure. The data processed therein, as scanned, is then projected onto the liquid crystal screen, in a manner as known in the art, in order to visually display the read text or other materials onto the screen, for ease of viewing by the user.

The circuitry also provides means, as summarized above, to provide for amplification or magnification of the read text, or for even its decrease in size, if that is necessary for the convenience of the user. In addition, the brightness may be controlled, to either a further brightness, or lesser brightness, once again, for the convenience of the user. And, the mode provides for various contrasting conditions, upon the screen, to provide for more ease of viewing of the projected materials.

Figure 4:
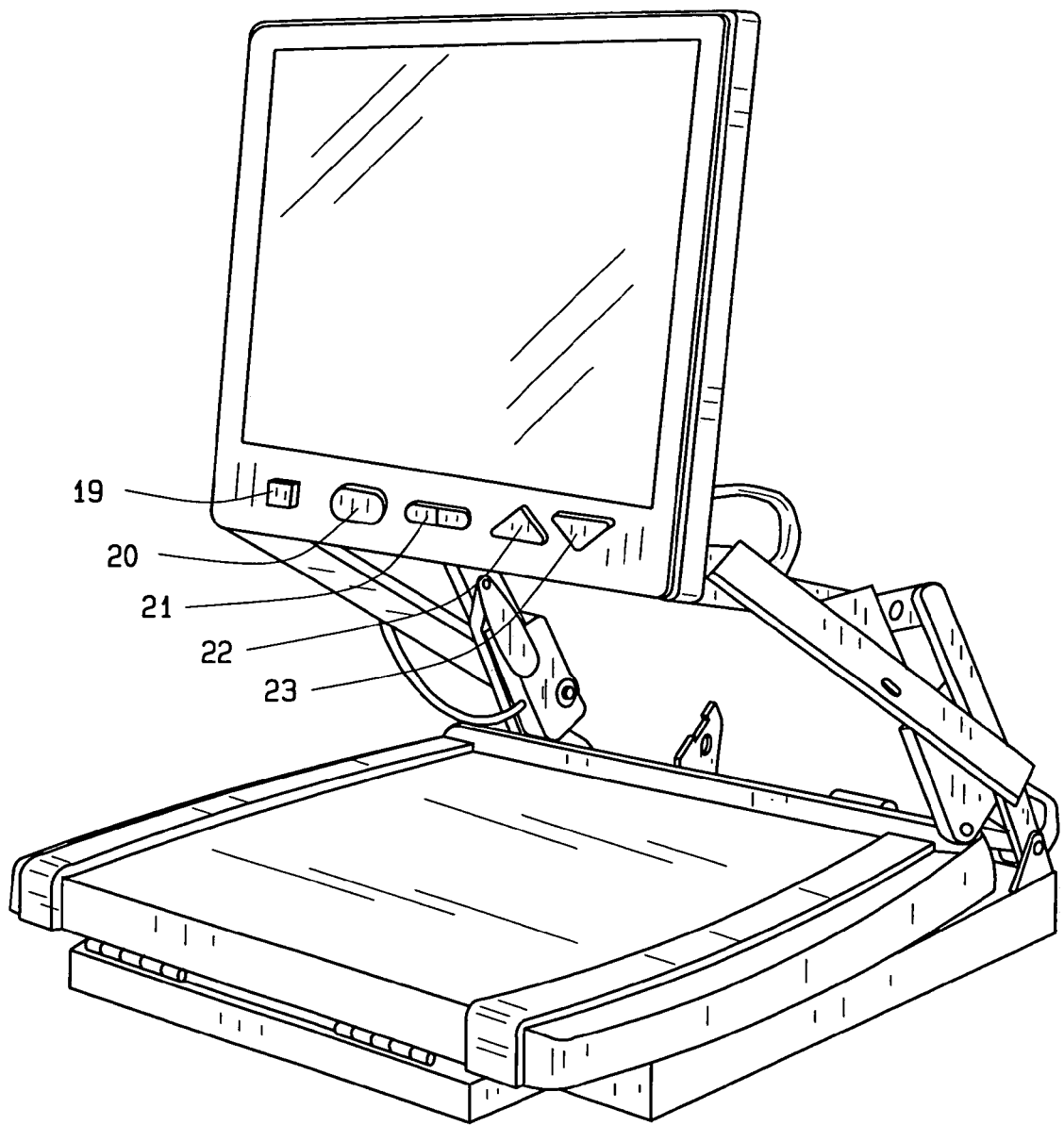
FIG. 4 shows an oblique view of the system from a front angle.

In addition, in referring to FIG. 4, it can also be seen that the on/off switch as at 19, is convenient provided for the ease of usage by the user. If the user is sight impaired, providing these controls directly in front of the user's face, makes them convenient for ease of manipulation, until the screen has been adjusted to that degree necessary to facilitate reading or viewing of the materials as scanned. In addition, the mode control button 20 is readily disclosed. The brightness control, for either brighter, or less bright conditions, can be manipulated by the switch 21. Furthermore, amplification can be attained through manipulation of the switch 22 to further magnify the materials shown upon the screen. Or, reduction in the amount of size, for the materials projected on the screen, can be controlled by the switch 23, all to the convenience of its user.

Figure 5:
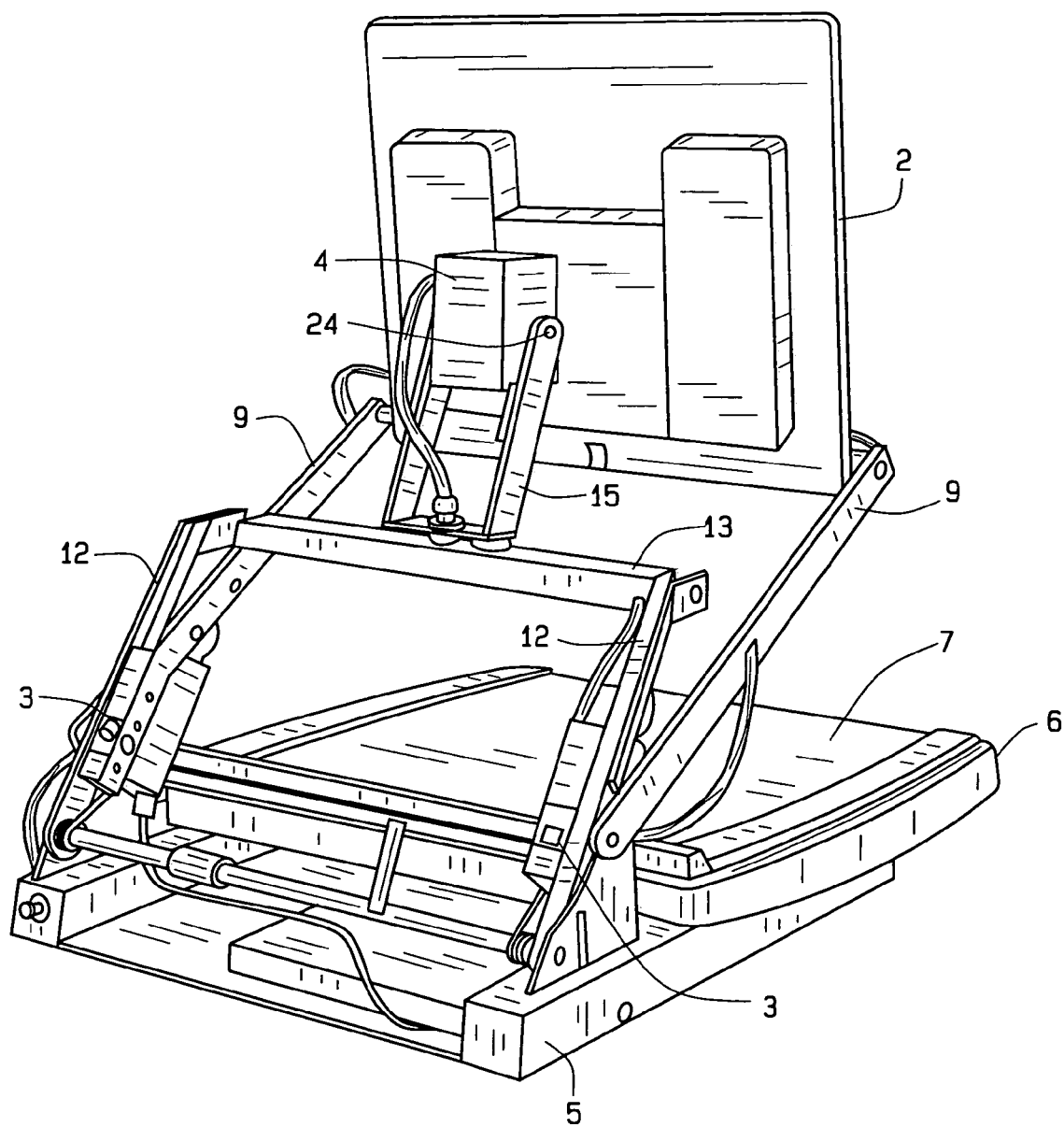
FIG. 5 provides an oblique view of the system from a rear angle.

FIG. 5 provides a more detailed view of the various support structure as previously explained for this invention. For example, the base 5 rests flatly upon any associated surface. The shiftable platform or platen 6, with its surface 7 upon which materials to be scanned, can be located, is readily disclosed, and because the shiftability of this particular platform, it may be shifted in either the X or Y direction, either laterally, or depth-wise, respectively, as can be readily understood.

In addition, the arms 9 that support the LCD screen 2 can be seen, and it can be easily determined how the arms allow for pivot of the screen forwardly, rearwardly, and slightly up or down, along a circumference line dictated by the pivot pins 3, that support the arms for such movement. Furthermore, the links 12, and the cross arm 13 that supports the pivotal bracket 15 that holds the mini cam 4 is readily disclosed, from this rear view. This provides support for the video screen.

Since the mini cam 4 is pivotally mounted by means of the pivot pins 24 it can be seen how the camera can be directed downwardly, or pivoted upwardly for directing its lens toward any distance, either laterally, to the rear, or up, depending upon what the user wishes to view, generally at a magnified condition, to facilitate the user's viewing of some other and distant object or person. As previously explained, this system may have the unique ability for enhancing the potential for a handicapped student to better comprehend a lecture, to be able to see it much more aptly, through the usage of the camera directed toward the teacher, or the blackboard, to pick up and project onto the screen, to ease the viewing and comprehension of the student, during classroom lecturing.

Since the video cam of this invention not only picks up the observable picture, or in the video mode, it likewise, obviously, can also detect sound, and allow for its recording or videoing out to another instrument, either for recording, or for listening, of the vocal aspects of any teacher or professor's lecture, in addition to enhancing the visual imaging of the teacher during a course lecture. This is all for the benefit of the impaired user.

The purpose of this invention is to provide a better solution for low vision handicapped people, in order to enhance their ability to view that is comparable to those with normal vision. This device incorporates state-of-the-art video magnification for enhanced vision purposes.

As stated, the shiftable platform of this invention is capable of being manipulated laterally, and depth-wise, or in the X-Y two-dimensional directions, as can be understood. Furthermore, the screen that projects the images for viewing, is angulated directly in front of the user's line of vision, which physiologically is the most convenient, avoiding any orthopedic stress which could otherwise harm the user, during extended applications. The camera means can easily move 360°, or on a horizontal plane, and 240° in the vertical plane, to view almost any surrounding area, or the shiftable platform upon which the readable material may be located, during its usage and application. The control means for this system are directly in front of the user, and can be positioned right at a margin of the screen, and yet, be able to monitor and control independently the camera, to provide for a better projected image to facilitate viewing of matter focused on the screen.

Weight and dimensions of this particular scanner are comparable to that of a laptop computer, which is important to a person suffering from handicaps, when setting up and making usage of this particular device. It incorporates a pop-up design, that will add to the students productivity in the classroom, and their ability to better understand what is being presented, whether spoken by the teacher, written on the chalkboard, or for any presentation made in front of the class, simply by scanning such activity through the use of the miniature camera, and projecting it at a magnified condition right in front of the handicapped student, for viewing and participation.

This particular device is readily adaptable for use in the office, allowing the user to manage better their daily tasks, since this device can be rested directly upon the office desk. It can be used to view colleagues while sitting and discussing at a conference table. It can be used to detect other areas of the room, or conference room, and provide for ease of viewing upon its fifteen inch (15") LCD screen, which can be raised, lowered, or otherwise manipulated, for the benefit of the user.

This particular system can also be used by the handicapped in the home. It can allow one to better manage their finances, to write checks, or writer other materials, or even to view family photos. A favorite television show, shown upon the TV screen, can be picked up by this mini cam, and amplified onto the LCD screen, right in front of the viewer. It allows the viewer to equally view, for their own enjoyment, just as much as the normal audience. It can allow the handicapped person to visit with friends, see their faces close up, viewed directly upon the TV monitor.

The device can even be used for traveling. It can be carried just like a compact computer, since it does fold up into its own enclosure, for conveyance. It can even be slipped into the suitcase, briefcase, or any optional carrying case made available, for ease of transit. One can sit at the airport and do their homework, reading, or other chores, because this device is not only hardwired, but is adaptable for battery operation, for use under portable conditions, for the benefit of the user.

This system incorporates the highest quality and versatility video magnification instruments, within its structure. It has its own light source, for illuminating any materials placed upon its shiftable platen. It has soft touch and easily recognizable button controls, readily observable in front of the user. It does have a battery powered option, which is important for travel. Its table or platform is shiftable, in two directions, so that the user may focus upon specific text, or design, of the materials being scanned. The monitor can be raised, lowered, pivoted, or shifted vertically, in its application. It incorporates adjustable horizontal and vertical monitor positioning. It is a very light weight design, with dimensions comparable to that of a laptop. There are no parts to assemble, it comes fully assembled, ready for usage, once that battery is installed, or it is hardwired. No diopter is required when moving the camera from a distant to close up viewing. One can simply swivel the camera, and pick up the view, without further focusing. The viewing modes include color, black on white, enhanced black on white, and enhanced reverse imaging.

Variations or modifications to the subject matter of this invention may occur to those skilled in the art upon review of the system as described herein. Such variations, if within the spirit of this development, are intended to be encompassed within the scope of the invention as defined. The description of the preferred embodiment, as depicted in the drawings, is set forth for illustrative purposes only.

The invention claimed is:

1. A closed circuit video magnification system for use by a viewer being vision impaired, including, a platform base, said platform base provided for resting upon a stable surface during usage of the system, a platen mounted upon the base and provided for shifting relative to the base in both the lateral and depth dimensions, structural arms connecting approximate the back edge of the base and normally extending upwardly therefrom during usage, a video screen mounted approximate the upper end of said structural arms, and capable of being manipulated into an upright position, to allow for its ease of observance by the vision impaired viewer, a linkage also extending upwardly from the approximate back edge of the base, said linkage capable of mounting a video camera normally for use in video recording any materials rested upon the shiftable platen and for projecting onto the video screen to facilitate its viewing by the viewer, circuitry provided for video recording any of said materials resting upon the shiftable platen, and for processing detected signals from the video camera for projection onto the video screen, said circuitry provided for magnification of the displayed materials to facilitate viewing of the projection by the vision impaired viewer, and said video screen and video camera capable of being collapsed into a contiguous location relative to the shiftable platen to allow for the system to be condensed, as during non-usage and storage.

2. The magnification system of claim 1 and including a pair of said structural arms extending upwardly from the approximate sides of the said base, said arms, at their upper ends, pivotally mounting the video screen thereto, thereby allowing for the screen to be pivoted between its upright viewable position or pivoted downwardly into a horizontal position contiguously above the shiftable platen.

3. The magnification system of claim 2 wherein said linkage comprises a pair of structural linkage extending up from the approximate rear side edges of the said base, a cross rail extending between the upper ends of the linkage structure, the video camera being mounted to the cross rail, and said camera capable of being pivoted for viewing both downwardly and in other directions relative to the shiftable platen, and said video camera capable of being swiveled to provide for viewing both forwardly, rearwardly, and laterally of the base, during its usage.

4. The magnification system of claim 3, wherein the structural linkage supporting the video camera are capable of extending, to provide for variations in the height of the location of the camera above the shiftable platen, during its usage.

5. The magnification system of claim 3 wherein said closed circuit video magnification system is portable.

6. The magnification system of claim 3 wherein the video camera may be turned to provide for scanning of relatively distant objects for projecting onto the video screen for ease of viewing by the viewer.

7. The magnification system of claim 6 wherein the distant scanning may be in a classroom setting to provide for magnified television viewing of an instructor and blackboard.

8. The magnification system of claim 2 wherein the structural arms are extendable, to provide for raising or lowering of the video screen relative to its supporting base.

9. The magnification system of claim 1 wherein manual controls for operations of the video camera, the video screen, and other controls are provided along the bottom edge of the video screen to facilitate their usage and application by the vision impaired viewer of said system.

10. The magnification system of claim 9, wherein the controls provide for regulating the amplification, magnification, reduction in size, brightness, contrast, and the on/off control of the closed circuit video magnification system.

11. The magnification system of claim 1, wherein the video screen is a flat LCD screen.

* * * * *